US011270168B1

(12) United States Patent
Otten et al.

(10) Patent No.: US 11,270,168 B1
(45) Date of Patent: Mar. 8, 2022

(54) METHOD AND SYSTEM FOR VEHICLE IMAGE CLASSIFICATION

(71) Applicant: Autodata Solutions, Inc., El Segundo, CA (US)

(72) Inventors: Hans Otten, London (CA); Jerad William, London (CA); Ming Cong, Long Beach, CA (US)

(73) Assignee: Autodata Solutions, Inc., Troy, MI (US)

( * ) Notice: Subject to any disclaimer, the term of this patent is extended or adjusted under 35 U.S.C. 154(b) by 0 days.

(21) Appl. No.: 16/290,696

(22) Filed: Mar. 1, 2019

Related U.S. Application Data

(60) Provisional application No. 62/638,012, filed on Mar. 2, 2018.

(51) Int. Cl.
*G06K 9/62* (2006.01)
*G06F 16/51* (2019.01)
*G06F 16/958* (2019.01)
*G06N 20/00* (2019.01)
*G06F 16/955* (2019.01)

(52) U.S. Cl.
CPC ............. *G06K 9/628* (2013.01); *G06F 16/51* (2019.01); *G06F 16/955* (2019.01); *G06F 16/958* (2019.01); *G06K 9/6232* (2013.01); *G06N 20/00* (2019.01); *G06K 2209/23* (2013.01)

(58) Field of Classification Search
CPC .. G06K 9/628; G06K 9/6232; G06K 2209/23; G06F 16/955; G06F 16/51; G06F 16/958; G06N 20/00
See application file for complete search history.

(56) References Cited

U.S. PATENT DOCUMENTS

| 5,978,519 | A  | 11/1999 | Bollman et al. |
| 6,956,587 | B1 | 10/2005 | Anson |
| 7,034,848 | B2 | 4/2006  | Sobol |
| 7,133,571 | B2 | 11/2006 | Cheatle |
| 7,528,846 | B2 | 5/2009  | Zhang et al. |

(Continued)

OTHER PUBLICATIONS

U.S. Appl. No. 17/234,667, filed Apr. 19, 2021 Non-Final Office Action dated Sep. 13, 2021.

(Continued)

*Primary Examiner* — Solomon G Bezuayehu
(74) *Attorney, Agent, or Firm* — Rutan & Tucker, LLP

(57) ABSTRACT

A method is disclosed that includes operations of receiving user input that includes a vehicle identifier (ID), responsive to receiving the user input, (1) determining a set of vehicle images corresponding to the vehicle ID, (2) a set of classification IDs corresponding to the set of vehicle images, wherein the set of classification IDs includes a classification ID for each vehicle image of the set of vehicle images, and (3) determining feature content corresponding to the set of classification IDs, generating an image-to-feature data map configured to associate the following (i) each vehicle image, (ii) one or more portions of the feature content, and (iii) one or more classification IDs, and transmitting the image-to-feature association to a logic module embedded in webpage code of a webpage, wherein the image-to-feature association includes instructions that, upon execution, cause a rendering of a first vehicle image and first feature content on the webpage.

25 Claims, 5 Drawing Sheets

(56) References Cited

U.S. PATENT DOCUMENTS

| | | | |
|---|---|---|---|
| 7,684,916 B2 | 3/2010 | Wei et al. | |
| 8,406,515 B2 | 3/2013 | Cheatle | |
| 9,070,402 B2 | 6/2015 | Burtnyk et al. | |
| 9,972,092 B2 | 5/2018 | Lin et al. | |
| 9,996,761 B2 | 6/2018 | Chen et al. | |
| 10,025,866 B2* | 7/2018 | Baker | G06F 3/04842 |
| 10,027,888 B1 | 7/2018 | Mackraz | |
| 10,229,589 B1* | 3/2019 | Watanabe | G06Q 50/26 |
| 10,346,723 B2 | 7/2019 | Han et al. | |
| 10,657,809 B2* | 5/2020 | Schumacher | G06K 9/00785 |
| 10,699,413 B1 | 6/2020 | Ansari | |
| 10,867,327 B1* | 12/2020 | Wilbert | H04W 4/40 |
| 10,984,503 B1 | 4/2021 | Otten et al. | |
| 2002/0172334 A1* | 11/2002 | Imade | G06Q 99/00 379/93.25 |
| 2004/0062435 A1* | 4/2004 | Yamaoka | G06K 9/4609 382/159 |
| 2010/0266208 A1 | 10/2010 | Downing et al. | |
| 2013/0250114 A1 | 9/2013 | Lu | |
| 2014/0025681 A1* | 1/2014 | Raines | G06Q 50/00 707/740 |
| 2014/0279068 A1* | 9/2014 | Systrom | G06Q 30/0269 705/14.73 |
| 2014/0279868 A1* | 9/2014 | Astorg | G06Q 30/02 707/609 |
| 2015/0036931 A1 | 2/2015 | Loui et al. | |
| 2015/0242516 A1* | 8/2015 | Lester | G06F 16/50 707/722 |
| 2015/0254762 A1* | 9/2015 | Fisher | G06Q 30/08 705/26.3 |
| 2015/0365636 A1* | 12/2015 | King | G06Q 30/06 348/37 |
| 2016/0148072 A1* | 5/2016 | Chan | G06K 9/00771 382/104 |
| 2016/0259994 A1 | 9/2016 | Ravindran et al. | |
| 2016/0381306 A1 | 12/2016 | Yang et al. | |
| 2017/0255983 A1* | 9/2017 | McCluskey | G06F 16/95 |
| 2017/0300785 A1 | 10/2017 | Merhav et al. | |
| 2017/0301063 A1 | 10/2017 | Merhav et al. | |
| 2017/0309255 A1* | 10/2017 | Deguzman | G06F 9/44 |
| 2018/0096497 A1 | 4/2018 | Bennett et al. | |
| 2018/0103209 A1 | 4/2018 | Fischler et al. | |
| 2018/0129917 A1* | 5/2018 | Chu | G06K 9/00758 |
| 2018/0173953 A1* | 6/2018 | Ghata | G06K 9/6202 |
| 2018/0181593 A1 | 6/2018 | Ranzinger et al. | |
| 2018/0240194 A1* | 8/2018 | Dong | G06Q 30/0185 |
| 2018/0260793 A1* | 9/2018 | Li | G06T 7/001 |
| 2018/0300576 A1* | 10/2018 | Dalyac | G06K 9/6218 |
| 2018/0314878 A1 | 11/2018 | Lee et al. | |
| 2018/0341832 A1* | 11/2018 | Uhlenbrock | G06K 9/6256 |
| 2018/0357803 A1 | 12/2018 | Zhang et al. | |
| 2019/0054966 A1* | 2/2019 | Park | G05D 1/0212 |
| 2019/0080169 A1* | 3/2019 | Nowak-Przygodzki | G06Q 30/02 |
| 2019/0103026 A1 | 4/2019 | Liu et al. | |
| 2019/0130671 A1* | 5/2019 | Dillow | G07C 5/0841 |
| 2019/0132520 A1 | 5/2019 | Gupta et al. | |
| 2019/0164313 A1 | 5/2019 | Ma et al. | |
| 2019/0279044 A1 | 9/2019 | Vasisht et al. | |

OTHER PUBLICATIONS

Ren et al., "Faster r-cnn: towards real-time object detection with region proposal networks," 2015, Advances in Neural Information Processing Systems 28 (NIPS 2015), pp. 1-9 (Year: 2015).

U.S. Appl. No. 16/290,762, filed Mar. 1, 2019 Final Office Action dated Mar. 9, 2020.

U.S. Appl. No. 16/290,762, filed Mar. 1, 2019 Non-Final Office Action dated Sep. 16, 2020.

U.S. Appl. No. 16/290,762, filed Mar. 1, 2019 Non-Final Office Action dated Sep. 23, 2019.

U.S. Appl. No. 16/290,762, filed Mar. 1, 2019 Notice of Allowance dated Dec. 23, 2020.

* cited by examiner

METHOD AND SYSTEM FOR VEHICLE IMAGE CLASSIFICATION

CROSS-REFERENCE TO RELATED APPLICATIONS

This application claims the benefit of priority on U.S. Provisional Application No. 62/638,012 filed Mar. 2, 2018, the entire contents of which are incorporated by reference herein.

FIELD

Embodiments of the disclosure relate to the field of automated image classification. More specifically, one embodiment of the disclosure relates to a system for automatically categorizing vehicle images, i.e., digital images, using a machine learning model and rendering a webpage including a classified vehicle image and corresponding textual information.

GENERAL BACKGROUND

Vehicle dealerships often have several vehicles located on their lots, sometimes hundreds or even thousands spread among a plurality of lots. Consumers may physically visit a dealership and their associated lots to view specific vehicles in person. By doing so, a consumer has the opportunity to assess the condition of a specific vehicle and review the specific vehicle's exact features. In such situations, a consumer is able to obtain a complete understanding of a specific vehicle the consumer may desire to purchase.

However, physically visiting a dealership is often inconvenient for consumers. For example, consumers may have busy schedules and be unable to visit the dealership during the hours the dealership is open. Additionally, the internet has provided a medium for presenting consumers information such that a consumer may review the information at any time and at any place, assuming an internet connection is available.

As a result, dealerships have begun to utilize the internet and create websites that provide consumers with information of vehicles on their lots. These dealership websites have several flaws and, as a result, do not provide consumers the same opportunity to obtain a complete understanding of a specific vehicle as provided when physically visiting a dealership's lot and inspecting a specific vehicle in person. For example, dealership websites often provide digital images of vehicles that may be referred to as "stock images." Stock images are generic images of a certain make and model of a vehicle provided by the manufacturer, not images of a specific vehicle located at a particular dealership having a unique Vehicle Identification Number (VIN). When a dealership website utilizes stock images, by visiting the dealership website, a consumer may obtain a general understanding of a particular vehicle type; however, the consumer is unable to see the specific vehicles residing at the dealership. Additionally, the stock images may not provide many angles or views of the vehicle. Therefore, dealership websites that utilize stock images do not provide a consumer with a complete understanding of the specific vehicle on the dealership's lot.

In most instances, in lieu of stock images, dealership websites may utilize images of specific vehicles at their dealerships (referred to as "lot images"). Specifically, dealerships obtain digital images of the specific vehicles on their lots from a third-party photographer, who is hired to take a set of photographs of certain vehicles and transmit the digital images to the dealership for placement on its website along with textual information directed to the vehicle features captured by each digital image.

Furthermore, as an aside, current systems and methods used by dealerships using lot images of actual vehicles also fail to present an image of a particular view and/or feature along with metadata, which may include information describing the view and/or feature shown. Specifically, dealerships typically obtain images of the specific vehicles on their lots from a third-party photographer hired to take a set of photographs of each vehicle on the dealership's lots and transmit the images to the dealership for use with the dealership's website. The images may be in any image file format, with examples including, but not limited or restricted to, JPEG, TIFF, BMP, RAW, JPEG, PNG, PDF, etc. In fact, the images received by a dealership do not include any metadata identifying the features or view shown in each image. Therefore, although the dealership may provide textual information describing the features of the specific vehicle on their website there is no coordination between the textual information and the vehicle image displayed. Therefore, when a dealership includes the images of a specific vehicle on their website, the textual information displayed often does not correspond to the view or features of the vehicle captured by the displayed image; thus, a consumer is not provided a complete understanding of a specific vehicle on the dealership's lot.

In order to provide a consumer with a complete understanding of the specific vehicle on the dealership's lot, it would be advantageous for a dealership's website to display an image of a specific vehicle along with textual information that provides details about the view captured by the displayed image and the features shown in the displayed image. However, currently, a dealership is unable to determine the view and features shown in each image for every vehicle on their lots. For instance, as mentioned above, a dealership may have hundreds or thousands of cars on their lots and, as there is high turnover on dealerships' lots, attempting to manually determine the view and features shown in each image would be a very inefficient use of the dealership's time and resources.

Therefore, a system and method are needed that enables a dealership to create a website that provides a consumer with a complete understanding of a specific vehicle on the dealership's lot by displaying the set of image of the specific vehicle along with textual information describing the view and features shown in each image.

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

Figure 1:
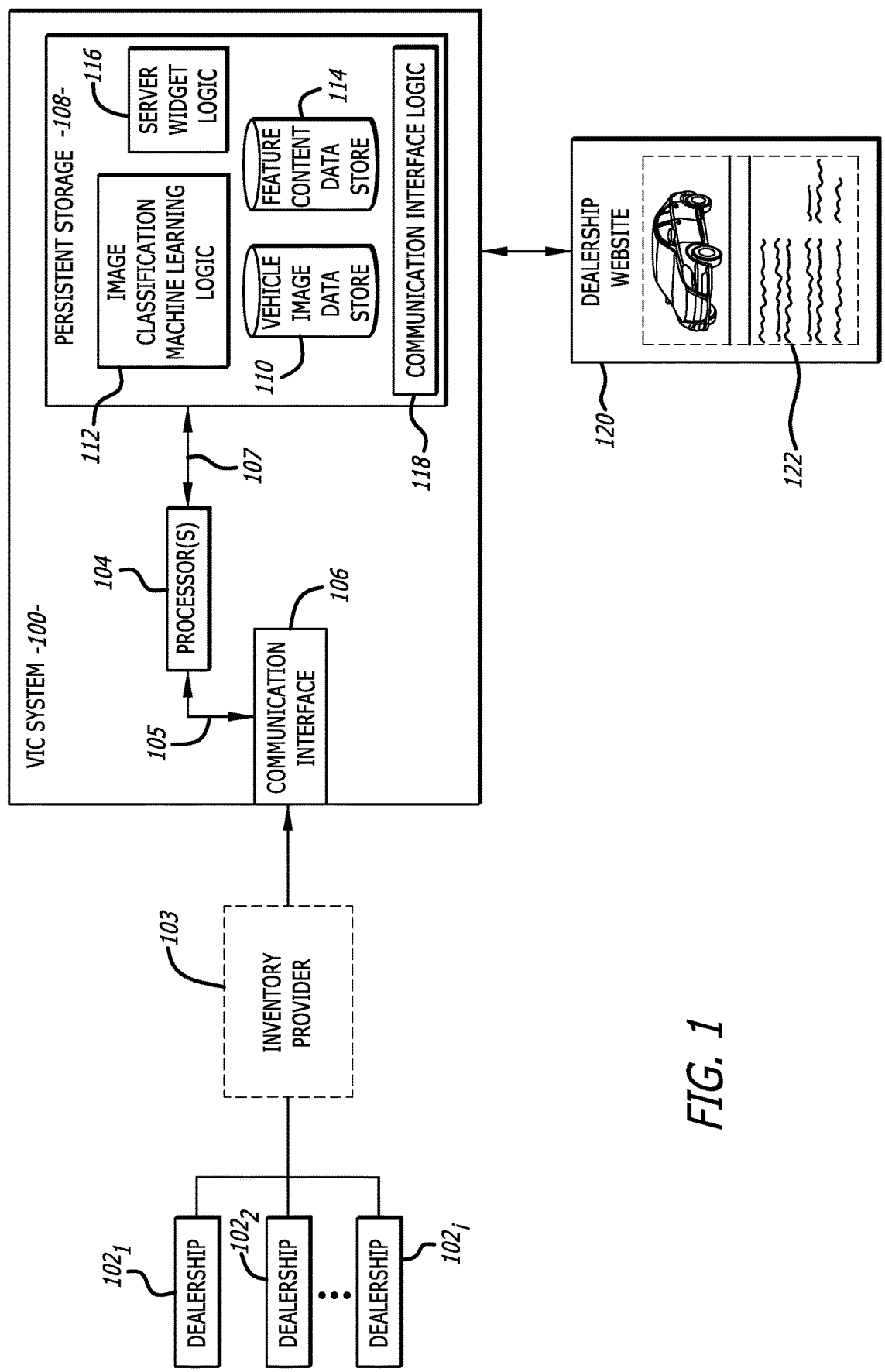
FIG. 1 is an exemplary embodiment of a logical representation of a vehicle image classification system.

Various embodiments of the disclosure are directed to an automated system and a method for classifying vehicle images using machine learning techniques, trained under supervised learning, and rendering a display including at least one of the classified vehicle images along with corresponding textual information describing the view and/or vehicle features included in the one or more vehicle images.

Although the disclosure is discussed in terms of digital images of vehicles, i.e., referred to as "vehicle images," the disclosure is not intended to be so limited. Instead, the automated system and method disclosed herein are applicable to all items. For example, as discussed below, the automated system may receive digital images of vehicles and/or features of a vehicle and the automated system may be integrated into a website of a vehicle dealership. However, the automated system may be configured to receive digital images of items other than vehicles and/or vehicle features. Examples of alternative items may include, but are not limited or restricted to, apparel, furniture, decor, office supplies, sporting equipment, construction tools and equipment, etc. Therefore, the disclosure is not limited to an automated system and method for use with vehicle images.

In one exemplary embodiment, during a first phase, the vehicle image classification (VIC) system receives and stores images of various perspectives of vehicles from vehicle dealerships (referred to hereinafter as "dealerships"). An image classification machine learning logic of the VIC system analyzes the images using machine learning techniques to determine the view and/or the vehicle features displayed in each image. Based on the results of the machine learning analysis, the image classification machine learning logic also classifies the images by assigning one of a predetermined list of classification IDs to each image. Additionally, the VIC system also stores information describing particular features and views of the vehicles pictured in the stored images. The information is divided into portions, with each portion describing a feature or view and assigned one of the predetermined list of classification IDs such that a feature or view and the portion of the information describing such are assigned the same or corresponding classification IDs. Hereinafter, the information may be referred to as "feature content" or "textual information."

Subsequently, during a second phase and upon a consumer loading a website of a dealership, software code embedded in the website of the dealership initiates communication with a widget of the VIC system, which causes the rendering of a graphical user interface (GUI) on the web site of the dealership. In response to receiving input from the consumer through the GUI, such as a selection of a specific vehicle on the dealership's lot and, optionally, a specific view or feature of the vehicle, the widget transmits information identifying the selected vehicle, e.g., a VIN of the vehicle, and a dealership identifier to a widget logic stored on a server device processing the VIC system. The server widget logic subsequently queries one or more data stores, e.g., databases or other storage mechanisms, within or external to the VIC system to retrieve one or more vehicle images corresponding to the selected vehicle, e.g., based on a VIN of the selected vehicle, as well as feature content of the selected vehicle. According to one embodiment of the disclosure, the server widget logic (or logic operating in concert with the server widget logic) accesses "build data" external to the VIC system to determine vehicle option codes associated with the VIN of the selected vehicle. According to one embodiment, the "build data" may include vehicle option codes for millions of vehicles that are classified by their VINs. Each "vehicle option code" is a prescribed value that is used by a particular original equipment manufacturer (OEM) to identify what features are installed on the vehicle identified by the VIN of the selected vehicle. As will be discussed in more detail below, each vehicle image and the feature content, divided into portions with each portion describing a particular feature of a vehicle, are classified. Based on the classification, the widget logic generates an image-to-feature association, which is transmitted to the widget. The widget then renders a display of the a vehicle image and the one or more portions of the feature content that describe the view and/or features included in the displayed vehicle image within the GUI on the dealership's website.

As mentioned above, although the disclosure discusses the invention with respect to car dealerships and vehicle images, such is merely one exemplary embodiment and the disclosure is not intended to be so limited. Instead, the principles of the disclosure including, but not limited to, receipt of a set of images, analysis of the set of images including the use of machine learning techniques and classification of each image, as well as rendering of a GUI including a categorized image and descriptive information corresponding to the categorized image, may be utilized in many embodiments other than with dealerships and vehicle images.

I. Terminology

In the following description, certain terminology is used to describe features of the invention. For example, in certain situations, the term "logic" and "component" are representative of hardware, firmware or software that is configured to perform one or more functions. As hardware, a component (or logic) may include circuitry having data processing or storage functionality. Examples of such circuitry may include, but are not limited or restricted to a hardware processor (e.g., microprocessor with one or more processor cores, a digital signal processor, a programmable gate array, a microcontroller, an application specific integrated circuit "ASIC," etc.), a semiconductor memory, or combinatorial elements.

Alternatively, the component (or logic) may be software, such as executable code in the form of an executable application, an Application Programming Interface (API), a subroutine, a function, a procedure, an applet, a servlet, a routine, source code, object code, a shared library/dynamic load library, or one or more instructions. The software may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; semiconductor memory; non-persistent storage such as volatile memory (e.g., any type of random access memory "RAM"); or persistent storage such as non-volatile memory (e.g., readonly memory "ROM," power-backed RAM, flash memory, phase-change memory, etc.), a solid-state drive, hard disk drive, an optical disc drive, or a portable memory device. As firmware, the executable code may be stored in persistent storage.

A "communication" generally refers to information transmitted in one or more electrical signals that collectively represent electrically stored data in a prescribed format. Each communication may be in the form of one or more packets, frames, HTTP-based transmissions, signals transmitted over telephone lines, or any other series of bits having the prescribed format. Herein, the terms "message," "communication" and "communication message" are used interchangeably. Specifically, the term "text message" refers to a communication transmitted to a phone number and transmitted via either a cellular data service provider (e.g., AT&T, Verizon, Sprint, etc.) or a set of private servers (e.g., privately owned or through cloud computing). Examples of text messages include, but are not limited or restricted to, short message service (SMS) messages and/or Apple iMessages®.

The term "computerized" generally represents that any corresponding operations are conducted by hardware in combination with software and/or firmware.

A "vehicle" is any motorized conveyance that allows a person to travel a greater distance in a shorter period of time than the person could travel alone. that allows vehicles used for transportation. One type of vehicle is an automobile that includes a chassis supported by four or more wheels (e.g., a car or a truck). Another type of vehicle is a conveyance without a chassis, such as a motorcycle, an all-terrain vehicle such as a quad, or a scooter for example. Yet another type of vehicle is a boat, waverunner or other water conveyance.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 2:
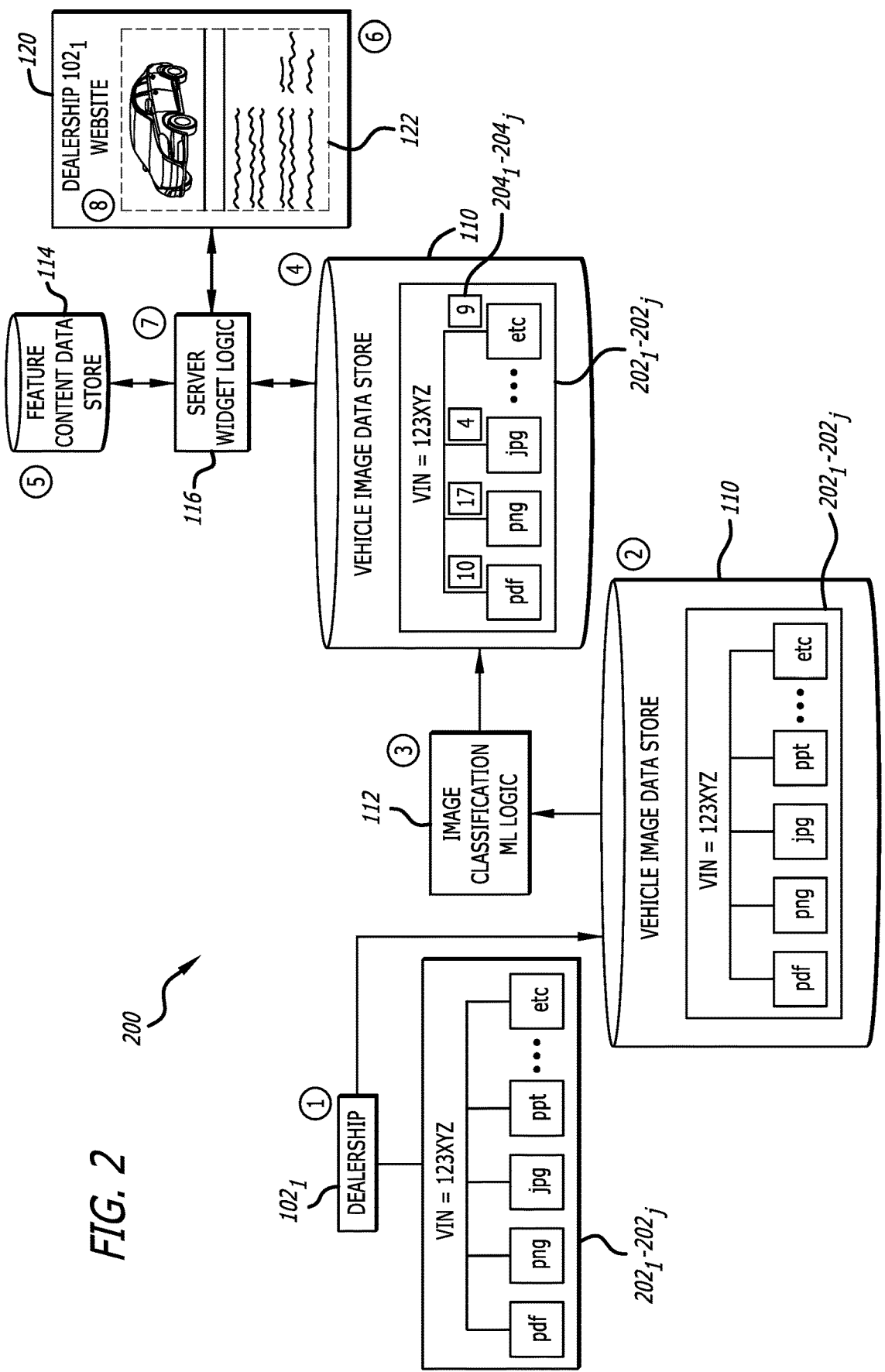
FIG. 2 is a block diagram illustrating a general flow of operations performed by the vehicle image classification system of FIG. 1.

Referring now to FIG. 1, an exemplary embodiment of a logical representation of a vehicle image classification system 100 is shown. The vehicle image classification (VIC) system 100, in one embodiment, may be stored on a non-transitory computer-readable storage medium of a server device that includes a housing, which is made entirely or partially of a hardened material (e.g., hardened plastic, metal, glass, composite or any combination thereof) that protects the circuitry within the housing, namely one or more processor(s) 104 that are coupled to a communication interface 106 via a first transmission medium 105. The communication interface 106, in combination with a communication interface logic 118, enables communications with external network devices, such as network devices of dealerships $102_1$-$102_i$ and network devices of consumers, not shown, which may display, for example, the website 120. Additionally, in some embodiments, as illustrated in FIG. 1 via a dotted box, the dealerships $102_1$-$102_i$ may optionally provide inventory data to the VIC system 100 by way of an inventory provider (e.g., a backend intermediary company) 103. For example, an inventory provider may receive the inventory of the dealership $102_1$ on a periodic or aperiodic basis (e.g., daily), which then transmits the received inventory to the VIC system 100. However, in other embodiments, the dealerships $102_1$-$102_i$ may transmit their inventory data directly to the VIC system 100, as illustrated in FIG. 2.

According to one embodiment of the disclosure, the communication interface 106 may be implemented as a physical interface including one or more ports for wired connectors. Additionally, or in the alternative, the communication interface 106 may be implemented with one or more radio units for supporting wireless communications with other electronic devices. The communication interface logic 118 may include logic for performing operations of receiving and transmitting electronic data via the communication interface 106 to enable communication between the VIC system 100 and network devices via a network (e.g., the internet) and/or cloud computing services.

The processors 104 are further coupled to a persistent storage 108 via a second transmission medium 107. According to one embodiment of the disclosure, the persistent storage 108 may include, a vehicle image data store 110, an image classification machine learning logic 112, a feature content data store 114, a server widget logic 116 and the communication interface logic 118. Of course, when implemented as hardware, one or more of these logic units could be implemented separately from each other.

In particular, the plurality of dealerships $102_1$-$102_i$ may use the VIC system 100 by integrating logic, e.g., embedding a widget being software code, into their website that calls the server widget logic 116 when the dealership's website is loaded by a consumer. The VIC system 100 enables a consumer, after loading a dealership's website, to select a specific vehicle located on the dealership's lot and view additional details of the specific vehicle in order to obtain a complete understanding of the specific vehicle. In particular, in response to receiving user input indicating a selection of a specific vehicle, the widget communicates with the server widget logic 116 to obtain information pertaining to the specific vehicle, e.g., vehicle images and textual information describing features or views illustrated in each vehicle image. The widget is then able to render a display illustrating a vehicle image of the selected vehicle and textual information describing the features included in the vehicle image. Additionally, in response to a selection of a particular view or feature of the specific vehicle via user input, the widget renders an image of the selected view or feature and textual information corresponding to the selected view or feature on a portion of the dealership's website to be viewed by the consumer. Exemplary embodiments of operations performed by the VIC system 100 are illustrated in FIGS. 2-5 and will be discussed in further detail below, along with specific details of the logic modules and data stores included within the VIC system 100.

Referring to FIG. 2, a block diagram illustrating a general flow of operations performed by the vehicle image classification system 100 of FIG. 1 is shown. As discussed above in FIG. 1, the VIC system 100 includes a vehicle image data store 110 that stores digital vehicle images, an image classification machine learning logic 112, a feature content data store 114 and server widget logic 116. It should be noted that, as illustrated in FIG. 1, a plurality of dealerships $102_1$-$102_i$, may utilize the VIC system 100. However, for purposes of clarity, in the embodiment illustrated in FIG. 2, a single dealership, e.g., the dealership $102_1$, is shown as utilizing the VIC system 100. First, the dealership $102_1$ obtains a set of vehicle images, e.g., the vehicle images $202_1$-$202_j$. The set of vehicle images may be obtained through, for example, a third-party photographer hired to take photographs of the vehicles on the lot of the dealership $102_1$.

Second, the VIC system 100 receives the vehicle images $202_1$-$202_j$ from the dealership $102_1$ and stores the vehicle images $202_1$-$202_j$ in the vehicle image data store 110. In particular, the vehicle images $202_1$-$202_j$ pertain to a specific vehicle on the lot of the dealership $102_1$. For example, the vehicle having a VIN of "123XYZ" may be located on a lot of the dealership $102_1$ and available for purchase by a consumer. The dealership $102_1$ provides a set of vehicle images of the $vehicle_{VIN=123XYZ}$, e.g., the vehicle images $202_1$-$202_j$, to the VIC system 100, with each of the vehicle images $202_1$-$202_j$ providing a view of the $vehicle_{VIN=123XYZ}$ and/or providing an image of one or more features of the $vehicle_{VIN=123XYZ}$.

Third, the general flow of operations performed by the VIC system 100 continues with an analysis of the vehicle images $202_1$-$202_j$ by the image classification machine learning logic (ML) 112. The analysis performed by the image classification ML logic 112 results in a classification of each of the vehicle images $202_1$-$202_j$, e.g., an assignment of a classification identifier (ID) to each of the vehicle images $202_1$-$202_j$. In one embodiment, a classification ID as assigned to a vehicle image may correspond to an item type descriptor that indicates an image assigned a particular classification ID illustrates a particular feature or view. More specifically, the image classification ML logic 112 applies a machine learning model previously generated by the image classification ML logic 112. The machine learning model is generated through supervised learning using a training set to generate a mapping function that represents an algorithm for mapping input data to an output (e.g., a vehicle image to a classification ID, or to a listing of features or views).

The application of the machine learning model to one of the vehicle images $202_1$-$202_j$ may include detection of points of interest using algorithms such as edge detection algorithms, corner detection algorithms, blob detection algorithms, feature description algorithms, etc. As one example, a detected point of interest within a vehicle image may correspond to an edge of a steering wheel. The detected points of interest may be provided to the machine learning model, which represents a correlation to the images comprising the training set used in generating the machine learning model. In one embodiment, the application of the machine learning model may provide a result for each vehicle image $202_1$-$202_j$, such as a numerical score, used to indicate the classification ID to assignment to each $202_1$-$202_j$, as discussed below.

In one embodiment, the results of the detection of points of interest may be used by the image classification ML logic 112 to determine a classification ID to be assigned to the vehicle image (e.g., the classification ID being an alphanumeric notation), with the assigned classification ID indicating one or more features illustrated in a vehicle image and/or a view illustrated by the vehicle image. In a second embodiment, the image classification ML logic 112 may utilize detected points of interest to determine a set of one or more features illustrated in the vehicle image and/or a view illustrated by the vehicle image, which is then compared to one or more datasets (e.g., tables or other data storage mechanisms) in order to determine the classification ID to be assigned to the vehicle image.

As one example, the image classification may assign one of a plurality of classification IDs to a vehicle image, with some classification IDs specifying, among others, "Front ¾ View Drivers," "Front ¾ View Passenger," "Side View Passenger," "Rear ¾ View Passenger," "Side View Drivers," "Rear View," "Roof/Sunroof," "Driver's Dashboard/Centre Console," "Center Console," "Door Controls," etc. Additionally, the assignment of classification IDs to each portion of the feature content may be predetermined and performed upon, or prior to, storage of portions of feature content in the feature content data store 114, as discussed below.

Figure 3:
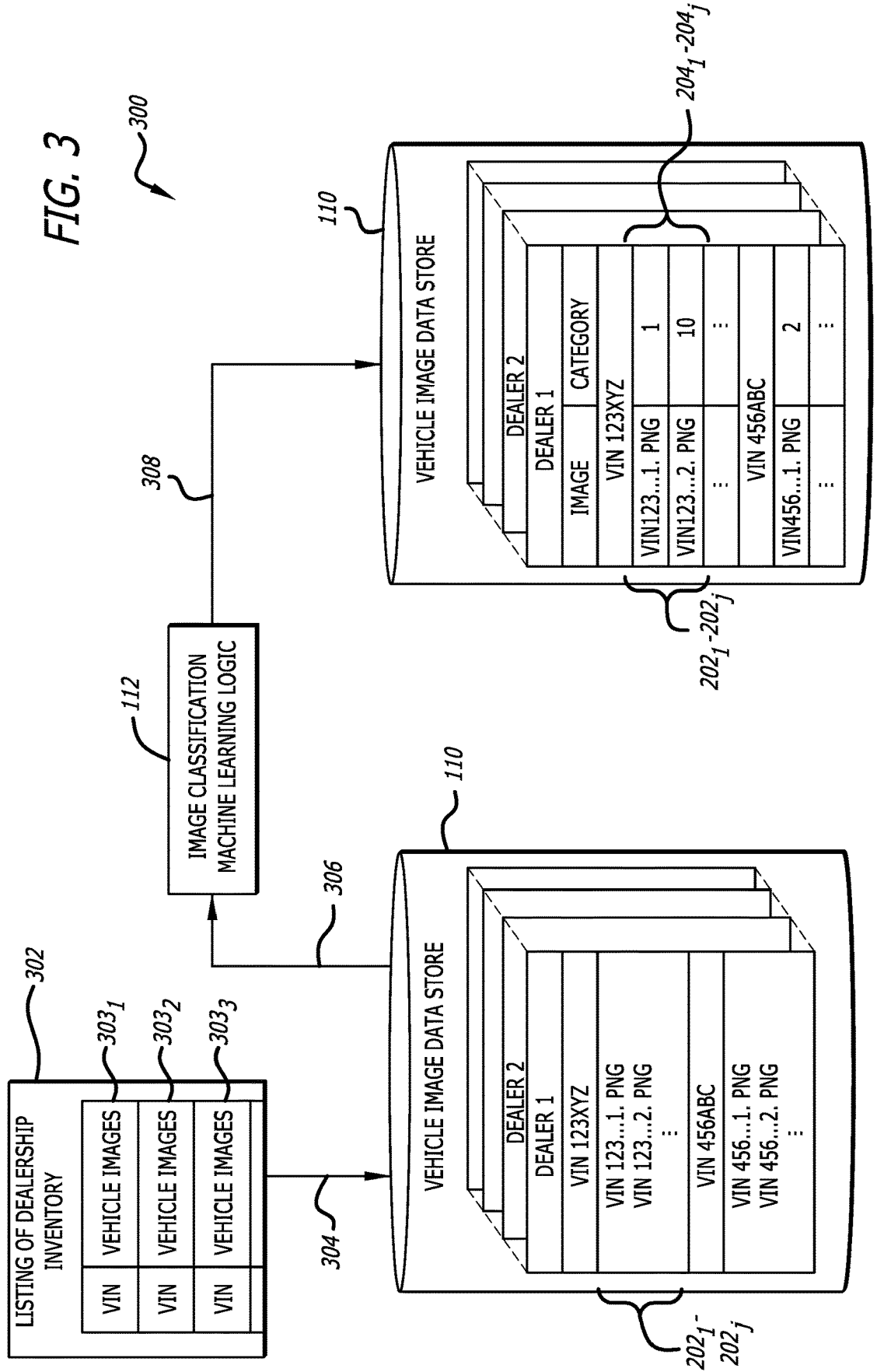
FIG. 3 is a second block diagram providing a detailed illustration of operations performed by the vehicle image classification system of FIG. 1 in determining a classification identifier corresponding to each vehicle image.
Figure 4:
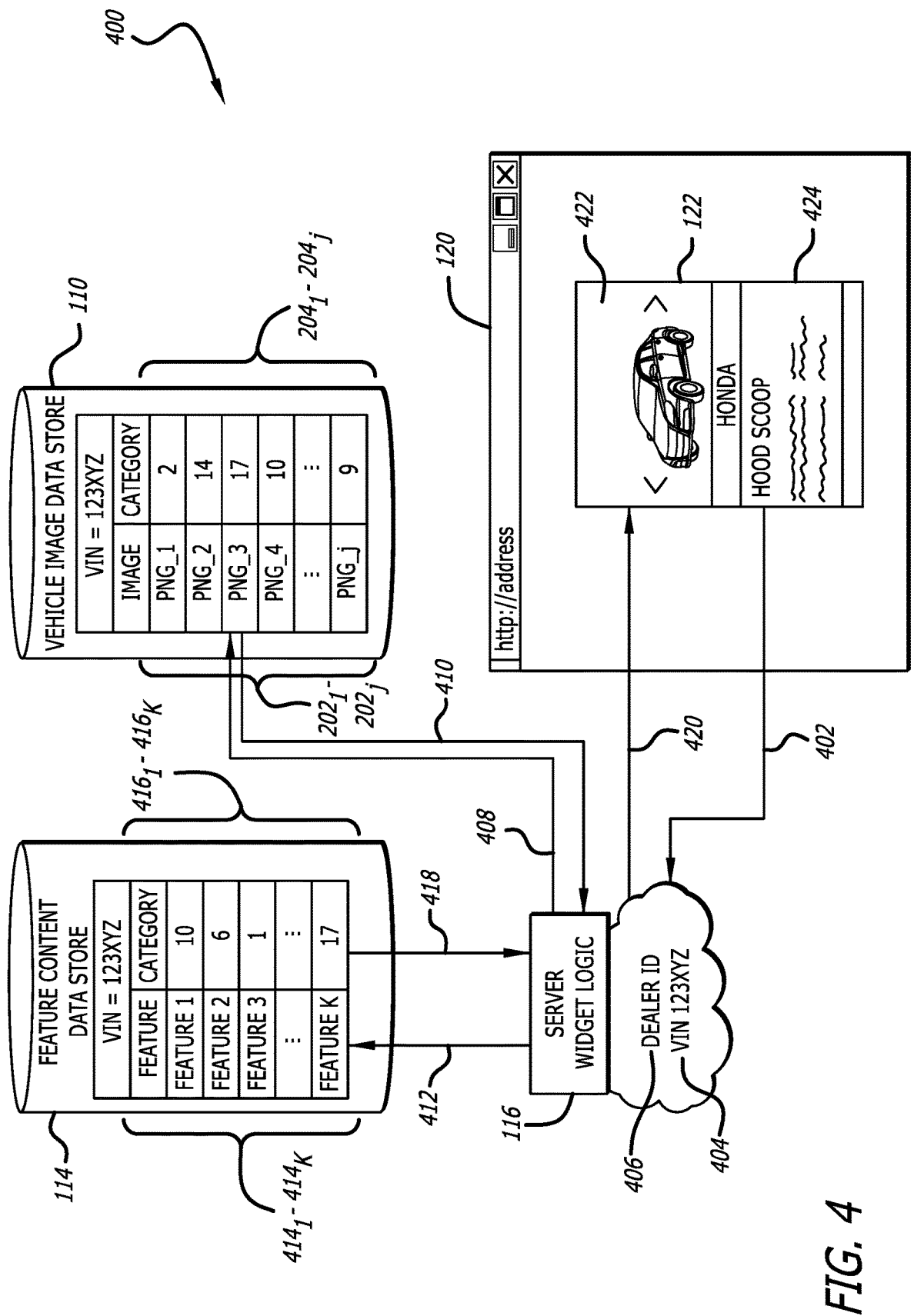
FIG. 4 is a third block diagram providing a flow of the utilization of categorized vehicle images along with feature content corresponding to the classification identifier of the vehicle image.

Fourth, upon assignment of a classification ID to each of the vehicle images $202_1$-$202_j$, the vehicle images $202_1$-$202_j$ and their corresponding classification IDs, e.g., the classification IDs $204_1$-$204_j$, are again stored in the vehicle image data store 110. Additional details regarding the image classification process and storage are illustrated in FIG. 3. Fifth, the feature content data store 114 stores feature content, which includes, at least, textual information describing one or more features or views of specific vehicles on the dealer's lot, e.g., the $vehicle_{VIN=123XYZ}$. The feature content related to the $vehicle_{VIN=123XYZ}$ may include a plurality of portions such that each portion describes a feature of the $vehicle_{VIN=123XYZ}$ and is assigned a classification ID, as illustrated in FIG. 4. For instance, the vehicle image $202_1$ may display a first feature and be assigned, for example, "classification ID 10," and a first portion of the feature content includes textual information describing the first feature and is also assigned "classification ID 10." Each portion of the feature content comprises information describing a particular feature or view and is assigned the classification ID corresponding to the classification IDs assigned to the vehicle image $202_1$-$202_j$ illustrating the feature or view. In one embodiment, the feature content portions may comprise textual information. In additional embodiments, the feature content portions may comprise textual information and/or additional information, which may include audio and/or video data.

Sixth, the general flow of operations performed by the VIC system 100 continues via as a widget embedded in the website 120 of the dealership $102_1$ receives consumer input. Specifically, when a consumer visits the website 120, the website 120 is loaded via an internet browser over an internet connection. Additionally, a widget, e.g., software code embedded into the source code of the website 120, not shown, initiates communication with the server widget logic 116 and renders a graphical user interface (GUI) 122 on a portion of the web site 120. The widget receives consumer input indicating a selection of a specific vehicle on the lot of the dealership $102_1$, e.g., the $vehicle_{VIN=123XYZ}$, through the GUI 122. In response to receiving the user input, the widget passes a set of parameters to the server widget logic 116, which may include, a dealership identifier and the VIN of the selected vehicle located on the lot of the dealership $102_1$.

Seventh, in response to receiving the parameters from the widget indicating the selection of a specific vehicle and the corresponding dealership, e.g., the $vehicle_{VIN=123XYZ}$ and the dealership $102_1$ or a representation thereof, the server widget logic 116 determines the features included in the $vehicle_{VIN=123XYZ}$. In one embodiment, as illustrated in FIG. 4, the server widget logic 116 queries the feature content data store 114 to retrieve a listing of all features of the specific vehicle based on the VIN. Additionally, the server widget logic 116 retrieves each vehicle image of the $vehicle_{VIN=123XYZ}$, e.g., vehicle images $202_1$-$202_j$. In a similar manner as with respect to the feature content, the server widget logic 116 may query the vehicle image data store 110 to retrieve the vehicle images, or URLs thereof, based on the VIN of the specific vehicle. Further, the server widget logic 116 matches the features of the $vehicle_{VIN=123XYZ}$ with one or more portions of feature content stored in the feature data store 114 based on the classification IDs assigned to each of the vehicle images $202_1$-$202_j$ and the portions of the feature content. More particularly, the server widget logic 116 (i) queries the vehicle image data store 110 for the vehicle images corresponding to the vehicle$_{VIN=123XYZ}$, e.g., the vehicle images $202_1$-$202_j$, and (ii) queries the feature content data store 114 for the feature content that corresponds to the features of the vehicle$_{VIN=123XYZ}$, wherein the queries may include the VIN and, optionally, the dealer identifier received from the widget.

The server widget logic 116 then generates an image-to-feature association that maps the retrieved feature content to the vehicle image illustrating the corresponding features and/or views based on the one or more classification IDs to each of the vehicles images and portions of feature content. For example, in one embodiment, a vehicle image may illustrate multiple features each corresponding to a single classification ID, such that the vehicle image will be associated with a single classification ID. In another embodiment, a first feature and a second feature may be illustrated in the vehicle image and assigned a first and second classification ID, respectively, such that the vehicle image is associated with multiple classification IDs. The image-to-feature association provides an association of: (i) a vehicle image, (ii) one or more features, and (iii) one or more classification IDs. The server widget logic 116 then transmits the image-to-feature association for the vehicle$_{VIN=123XYZ}$ to the widget along with the vehicle images $202_1$-$202_j$ and corresponding feature content. Finally, eighth, upon receiving the image-to-feature association from the server widget logic 116, the widget references the image-to-feature association, which instructs the widget as to which of the vehicle images $202_1$-$202_j$ to display in the GUI 122.

In one embodiment, when providing input to select a specific vehicle, the consumer also selects a view or feature of the vehicle, e.g., a "front view." For example, in order to determine a vehicle image to display and the corresponding classification ID, the widget compares the consumer selected feature or view to a dataset, e.g., a table storing features/view and the corresponding classification IDs, that indicates a classification ID corresponding to each feature and/or view. In one embodiment, the dataset may be stored in the persistent storage 108 of FIG. 1 and provided by the server widget logic 116 with the image-to-feature association. In an alternative embodiment, the dataset may be included within the widget. In yet another embodiment, a default view is used by the widget for an initial rendering of the display of the selected vehicle.

By comparing consumer input or the default view to the dataset, the widget may determine the classification ID of the selected feature or view, which enables the widget to display the one or more portions of feature content based on the image-to-feature association. Upon determining the classification ID, the widget causes the rendering of the vehicle image and the one or more portions of feature content that correspond to the determined one or more classification IDs, with the rendering occurring within the GUI 122 of the website 120. As the user selects a second feature or view for display, the widget again references the image-to-feature association for instruction as to which vehicle image and portions of feature content to render.

Referring to FIG. 3, a second block diagram providing a detailed illustration of the classification of each vehicle image is shown. The flow 300 illustrates, generally, that a listing 302 of active inventory records for a particular dealership, e.g., the dealership $102_1$, are received by the vehicle image data store 110 (at operation 304). In particular, the listing 302 may include (i) a VIN $303_1$-$303_N$ (N≥1) associated with each "N" vehicle being advertised by the particular dealership and (ii) the vehicle images $202_1$-$202_j$ that correspond to the vehicle$_{VIN=123XYZ}$ of dealership $102_1$ as discussed in FIG. 2 as well as vehicle images for additional vehicles of dealerships $102_1$-$102_i$ as discussed in FIG. 1 and dealer inventory records comprising a listing of vehicles (e.g., vehicle VINs) of vehicles on the lots of dealerships $102_1$-$102_i$.

Following the storage of the listing 302 in the vehicle image data store 110, at least the vehicle images included in the listing 302 are provided to the image classification ML logic 112 for analysis (operation 306), or a URL directed thereto enabling retrieval of the vehicle images by the classification ML logic 112. As discussed above, the analysis includes applying a machine learning model previously generated by the image classification ML logic 112 to the vehicle images included in the listing 302. The application of the machine learning model to one of the vehicle images may include detection of points of interest using algorithms such as for example, SIFT, to detect points of interest within the vehicle image. The points of interest may then be provided to the machine learning model, which upon processing the points of interest, results in the assignment of a classification ID to the vehicle image.

The results of the analysis, e.g., the categorized vehicle images, are provided to the vehicle image data store 110 for storage (operation 308). FIG. 3 provides an exemplary illustration of storage of the listing 302 in the vehicle image data store 110 before and after classification of the vehicle images. Specifically, a table or other data storage mechanism (collectively referred to as a "table") may be generated for each dealership $102_1$-$102_i$ such that the listing 302 is stored on a per dealership basis. Further, the exemplary diagram of FIG. 3 illustrates that each table may include a column for the vehicle images, e.g., the vehicle images $202_1$-$202_j$, and a column including the corresponding classification ID, e.g., the classification IDs $204_1$-$204_j$.

Referring now to FIG. 4, a third block diagram providing a flow of the utilization of categorized vehicle images along with feature content corresponding to the classification ID of the vehicle image is shown. As an initial operation in the flow, input 402 may be received by the widget through the GUI 122 as described in FIGS. 1-2. Based on the input 402, the widget determines the VIN 404 of the selected vehicle and a dealer identifier 405, which are provided to the server widget logic 116.

Upon receiving the VIN 404 and the dealer ID 405, the server widget logic 116 transmits a query 408 to the vehicle image data store 110 requesting the vehicle images of the vehicle having VIN 404, e.g., the vehicle images $202_1$-$202_j$, along with their corresponding classification IDs, e.g., the classification IDs $204_1$-$204_j$. The server widget logic 116 receives the vehicle images of the vehicle having VIN 404 and their corresponding classification IDs via transmission 410.

Additionally, the server widget logic 116 transmits a query 412 to the feature content data store 110 requesting the feature content, e.g., one or more of the portions $414_1$-$414_k$, that correspond to the vehicle having VIN 404. When the content feature data store 114 includes one or more portions of feature content corresponding to the vehicle having VIN 404, the one or more portions of feature content are provided to the server widget logic 116 via transmission 418.

Upon receiving the vehicle images of the vehicle having VIN 404 and the one or more portions of feature content corresponding to the features of the vehicle having VIN 404, the server widget logic 116 generates an image-to-feature association, as discussed above. The server widget logic 116 then transmits the image-to-feature association to the widget along with the vehicle images and corresponding feature content via transmission 420.

Responsive to receiving the image-to-feature association, the widget references the image-to-feature association, which provides instructions as to the vehicle image and feature content to display based on either the consumer input or default settings, as discussed above. The widget then causes the rendering of the displays 422 (e.g., a vehicle image display) and 424 (e.g., a feature content display) within the GUI 122 on the website 120. Thus, the utilization of the VIC system 100, which includes the server widget logic 116, the vehicle image data store 110, the feature content data store 114 and the widget, enables a consumer visiting a dealership's website to obtain a complete understanding of features and views of a specific vehicle on the dealership's lot through a GUI display of (i) an image of the feature or view of the specific vehicle, and (ii) feature content, e.g., textual information, that describes the feature or view in the image displayed by the GUI.

In additional embodiments, the feature content data store 114 may be split into multiple data stores. For example, a first data store may include a table for each VIN that includes a list of features of the vehicle corresponding to the VIN, and a second data store may include a feature to classification ID association.

Figure 5:
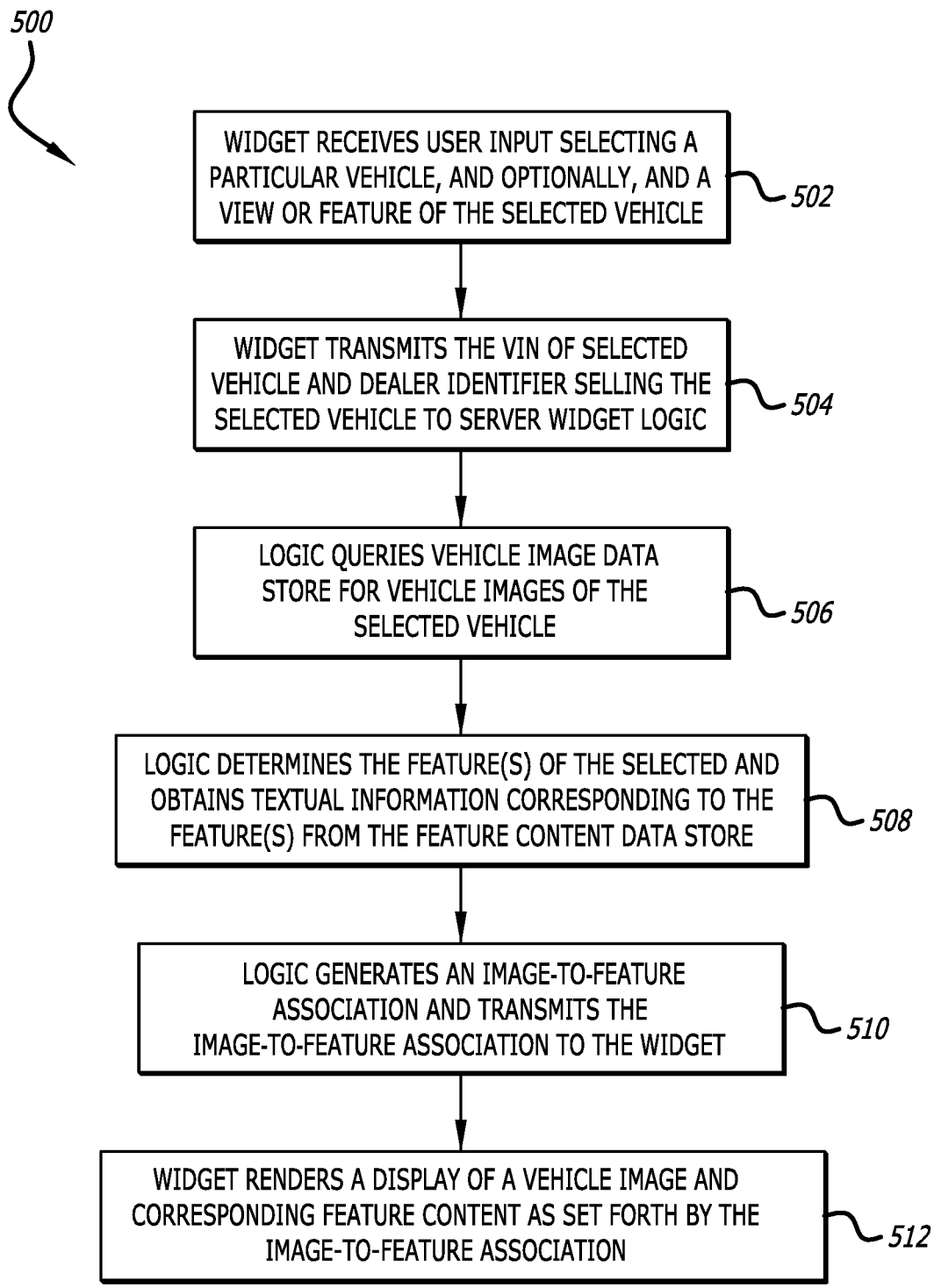
FIG. 5 is a flowchart illustrating the utilization of categorized vehicle images along with feature content corresponding to the classification identifier of the vehicle image of FIG. 4.

Referring to FIG. 5, a flowchart illustrating the utilization of categorized vehicle images along with feature content corresponding to the classification ID of the vehicle image of FIG. 4 is shown. Each block illustrated in FIG. 5 represents an operation performed in the method 500 of rendering a portion of a webpage to include a vehicle image and feature content based on received user input and according to a set of automatically categorized vehicle images. It is assumed that prior to the beginning of the method 500, a dealership website has been loaded via an internet browser, with the server widget logic 116 of FIG. 1 causing the rendering of the GUI 122 on at least a portion of dealership's website. Thus, the method 500 begins when the widget receives user input selecting a particular vehicle, and, optionally, a view or feature of the selected vehicle (block 502). In one embodiment, the user input may also indicate particular view and/or feature of the vehicle, as discussed above. In other embodiments, when the user input does not include the selection of a view or a feature, default settings may be utilized indicating a view and/or feature.

In response to receiving the user input, the widget transmits the VIN of the selected vehicle and a dealership identifier of the dealership selling the selected vehicle to server widget logic 116 (block 504). In response to receiving the VIN of the selected vehicle and dealership identifier, the server widget logic 116 determines the feature(s) of the selected vehicle and obtains feature content corresponding to the feature(s) from the feature content data store 114 (block 506). In some situations, a vehicle image may not be stored that corresponds to a determined classification ID (i.e., no image was received from the dealership illustrating a particular feature of a specific vehicle). In such an instance, the widget may use a default vehicle image (e.g., a vehicle image of a default view, such as a front view), a stock image, or not render a vehicle image when displaying the textual information.

The server widget logic 116 also queries the vehicle image data store 110 for URLs of vehicle images corresponding to the VIN of the selected vehicle (block 508). For instance, referring to FIG. 4, the feature content data store 114 is shown to include one or more tables, e.g., a table storing feature-classification ID associations for the vehicle$_{VIN=123XYZ}$. Thus, the server widget logic 116 may retrieve feature content for the features of the vehicle$_{VIN=123XYZ}$ by querying the feature content data store 114. Although not illustrated, in some embodiments, one or more features may correspond to the same classification ID. As one example, a first classification ID may be assigned to a steering wheel, a dashboard and a navigation device; such that a vehicle image including the steering wheel, the dashboard and the navigation device may be assigned a single classification ID. As an alternative embodiment, each feature may correspond to a unique classification ID and a vehicle image be may assigned a plurality of classification IDs when a plurality of features are illustrated in the vehicle image.

In most instances, textual information may not be available for a particular feature or view; thus, no textual information would be received by the server widget logic 116. Similar to the embodiment in which a vehicle image corresponding to the determined classification ID is not available, when textual information corresponding to the determined classification ID is not available, default textual information may be provided to the server widget logic 116, or no textual information may be provided such that no textual information will be rendered by the widget, as discussed below.

In response to receiving the vehicle images and the textual information of the features of the selected vehicle, the server widget logic 116 generates an image-to-feature association, which, as discussed above, provides an association of: (i) a vehicle image, (ii) one or more features, and (iii) one or more classification IDs. The server widget logic 116 then transmits the image-to-feature association to the widget, along with Uniform Resource Locators (URLs) to one or more of the vehicle images and feature content (block 510). In response to receiving the image-to-feature association, the widget renders a display of a vehicle image and the corresponding feature content based on the image-to-feature association and the consumer input or default settings (block 512). In particular, the image-to-feature association provides instructions to the widget, based on the consumer input or default settings, as to which vehicle image and what feature content to display. As discussed above, the widget may receive input as to a selected view or feature to display, or use default settings if no view or feature is initially selected by the consumer. The widget referencing the image-to-feature association in view of the selected view or feature or default setting, to obtain the feature content and vehicle image URL for rendering. As discussed above, the widget may not cause the rendering of a vehicle image or textual information corresponding to the determined classification ID when either is not available. In some instances, default images or contextual information may be used.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A non-transitory storage medium having logic stored thereon, the logic being executable by one or more processors to perform operations including:
   performing analyses of each vehicle image of a collection of vehicle images in accordance with a machine learning model, the analyses of each vehicle image includes (i) detecting a set of points of interest associated with each vehicle image of the collection of vehicle images and (ii) assigning a classification identifier (ID) to each vehicle image of the collection of vehicle images based on the detected set of points of interest, the classification ID for each vehicle image operates as an item type descriptor to indicate that a vehicle image illustrates a particular feature;

receiving user input that includes a vehicle identifier (ID), the vehicle ID being different from the classification ID assigned to each vehicle image;

responsive to receiving the user input, (1) determining a set of vehicle images corresponding to the vehicle ID, (2) determining a set of classification IDs corresponding to the set of vehicle images, wherein each classification ID of the set of classification IDs is associated with a vehicle image of the set of vehicle images based on which features are captured by the vehicle image, and (3) determining feature content corresponding to each classification ID of the set of classification IDs, wherein the feature content includes at least textual information describing the particular feature;

generating an image-to-feature data association for each of the set of vehicle images including a first vehicle image, the image-to-feature data association for the first vehicle image to associate the first vehicle image of the set of vehicle images with (i) one or more portions of the feature content, and (ii) one or more classification IDs representing one or more features captured by the first vehicle image; and transmitting the image-to-feature association to a logic module embedded in webpage code of a webpage, wherein the image-to-feature association includes instructions that, upon execution, cause a rendering of the first vehicle image and first feature content on the webpage, wherein the first vehicle image and the first feature content are associated with a first classification ID of the set of classification IDs corresponding to the vehicle ID.

2. The non-transitory storage medium of claim 1, wherein the logic being executable by the one or more processors to perform further operations including:

prior to receiving the user input, performing a machine learning analysis trained on a collection of vehicle images, the collection of vehicle images including the set of vehicle images.

3. The non-transitory storage medium of claim 2, wherein the machine learning analysis includes applying a machine learning model to the collection of vehicle images, the machine learning model is configured to detect the set of points of interest within each vehicle image and assign the classification ID to each vehicle image based on the detected set of points of interest.

4. The non-transitory storage medium of claim 3, wherein the collection of vehicle images each having at least one assigned classification ID are stored in a data store.

5. The non-transitory storage medium of claim 3, wherein the user input includes a dealership ID, and the collection of vehicle images is stored in the data store such that each vehicle image (i) has an assigned classification ID, and (ii) is associated with at least one dealership ID.

6. The non-transitory storage medium of claim 3, wherein applying the machine learning model includes:

determining one or more features illustrated in the first vehicle image based on a set of detected set of points of interest for the first vehicle image; and determining the first classification ID based an association of features and classification IDs.

7. The non-transitory storage medium of claim 1, wherein each classification ID of the set of classification IDs indicates a particular feature illustrated in a vehicle image.

8. The non-transitory storage medium of claim 1, wherein the vehicle ID is a vehicle identification number (VIN).

9. A method comprising:

performing analyses of each vehicle image of a collection of vehicle images in accordance with a machine learning model, the analyses of each vehicle image includes (i) detecting a set of points of interest associated with each vehicle image of the collection of vehicle images and (ii) assigning a classification identifier (ID) to each vehicle image of the collection of vehicle images based on the detected set of points of interest, a classification ID for each vehicle image operating as an item type descriptor to indicate that a vehicle image illustrates a particular feature;

receiving user input that includes a vehicle identifier (ID), the vehicle ID being different from the classification ID assigned to each vehicle image;

responsive to receiving the user input, (1) determining a set of vehicle images corresponding to the vehicle ID, (2) determining a set of classification IDs corresponding to the set of vehicle images, wherein one or more classification IDs of the set of classification IDs are associated with a first vehicle image of the set of vehicle images based on which features are captured by the first vehicle image, and (3) determining feature content corresponding to each of the set of classification IDs, wherein the feature content includes at least textual information describing the particular feature;

generating an image-to-feature data association for each of the set of vehicle images including a first vehicle image, the image-to-feature data for the first vehicle image to associate the first vehicle image of the set of vehicle images with (i) one or more portions of the feature content, and (ii) the one or more classification IDs representing one or more features captured by the first vehicle image; and transmitting the image-to-feature association to a logic module embedded in webpage code of a webpage, wherein the image-to-feature association includes instructions that, upon execution, cause a rendering of the first vehicle image and first feature content on the webpage, wherein the first vehicle image and the first feature content are associated with a first classification ID of the set of classification IDs corresponding to the vehicle ID.

10. The method of claim 9, wherein
the machine learning model is trained on a collection of vehicle images, the collection of vehicle images including the set of vehicle images.

11. The method of claim 10, wherein the analyses comprise applying the machine learning model to the collection of vehicle images to detect the set of points of interest within each vehicle image and assign the classification ID to each vehicle image based on the detected set of points of interest.

12. The method of claim 11, wherein the collection of vehicle images each having an assigned classification ID are stored in a data store.

13. The method of claim 11, wherein the user input includes a dealership ID, and the collection of vehicle images is stored in the data store such that each vehicle image (i) has an assigned classification ID, and (ii) is associated with at least one dealership ID.

14. The method of claim 11, wherein applying the machine learning model includes:
determining one or more features illustrated in the first vehicle image based on the detected set of points of interest for the first vehicle image.

15. The method of claim 9, wherein each classification ID of the set of classification IDs indicates a particular feature illustrated in a vehicle image.

16. The method of claim 9, wherein the vehicle ID is a vehicle identification number (VIN).

17. A system comprising:
one or more processors;
a non-transitory computer-readable medium communicatively coupled to the one or more processors and having logic stored thereon, the logic including instructions being executable by the one or more processors to perform operations including:
performing analyses of each vehicle image of a collection of vehicle images in accordance with a machine learning model, the analyses of each vehicle image includes (i) detecting a set of points of interest associated with each vehicle image of a collection of vehicle images and (ii) assigning a classification identifier (ID) to each vehicle image of the collection of vehicle images based on the detected set of points of interest, a classification ID for each vehicle image operating as an item type descriptor to indicate that a vehicle image illustrates a particular feature;
receiving user input that includes a vehicle identifier (ID), the vehicle ID being different from the classification ID assigned to each vehicle image;
responsive to receiving the user input, (1) determining a set of vehicle images corresponding to the vehicle ID, (2) determining a set of classification IDs corresponding to the set of vehicle images, wherein one or more classification IDs of the set of classification IDs are associated with a first vehicle image of the set of vehicle images based on which features are captured by the first vehicle image, and (3) determining feature content corresponding to the set of classification IDs, wherein the feature content includes at least textual information describing the particular feature;
generating an image-to-feature data association for each of the set of vehicle images including a first vehicle image, the image-to-feature data for the first vehicle image to associate the first vehicle image of the set of vehicle images with (i) one or more portions of the feature content, and (ii) one or more classification IDs representing one or more features captured by the first vehicle image; and
transmitting the image-to-feature association to a logic module embedded in webpage code of a webpage, wherein the image-to-feature association includes instructions that, upon execution, cause a rendering of the first vehicle image and first feature content on the webpage, wherein the first vehicle image and the first feature content are associated with a first classification ID of the set of classification IDs corresponding to the vehicle ID.

18. The system of claim 17, wherein the
machine learning model being trained on a collection of vehicle images, the collection of vehicle images including the set of vehicle images.

19. The system of claim 17, wherein the analyses of each vehicle image of the collection of vehicle images in accordance with a machine learning model includes applying the machine learning model to the collection of vehicle images to detect the set of points of interest within each vehicle image and assigns one or more classification IDs to each vehicle image based on the detected set of points of interest.

20. The system of claim 17, wherein the collection of vehicle images each having an assigned classification ID are stored in a data store.

21. The non-transitory storage medium of claim 1, wherein each classification ID of the one or more classification IDS further representing the one or more features captured by the first vehicle image further represent a view captured by the first vehicle image.

22. The method of claim 9, wherein the one or more classification IDs of the set of classification IDS associated with the first vehicle image are further associated with a view captured by the first vehicle image.

23. The method of claim 22, wherein the feature content further includes textual information describing the view.

24. The system of claim 17, wherein the one or more classification IDs of the set of classification IDS are associated with the first vehicle image based further on which view is captured by the first vehicle image.

25. The system of claim 24, wherein the feature content further includes textual information describing the view.

* * * * *